July 29, 1952  H. V. JORDON  2,605,048
SLIDE CALCULATOR
Filed Oct. 28, 1949
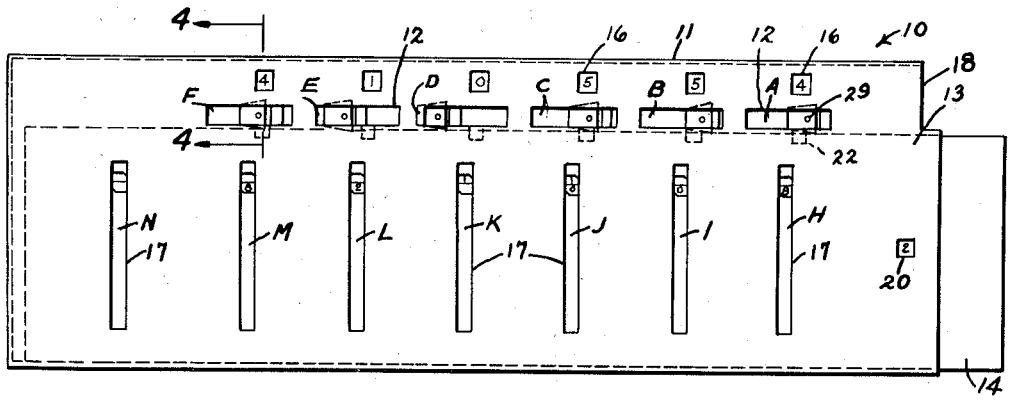
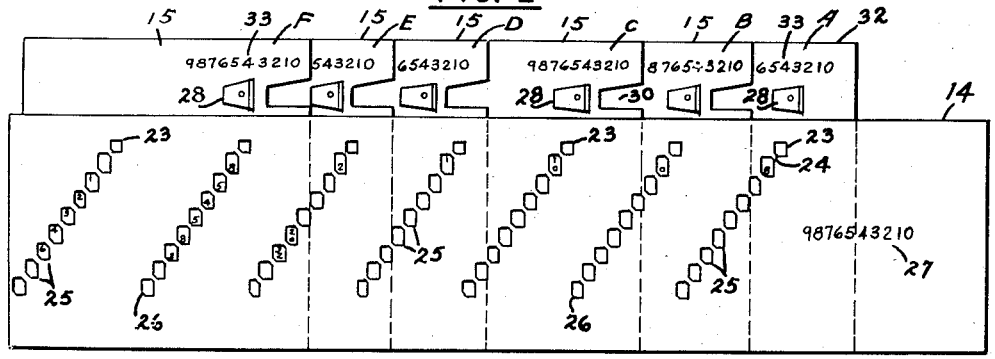
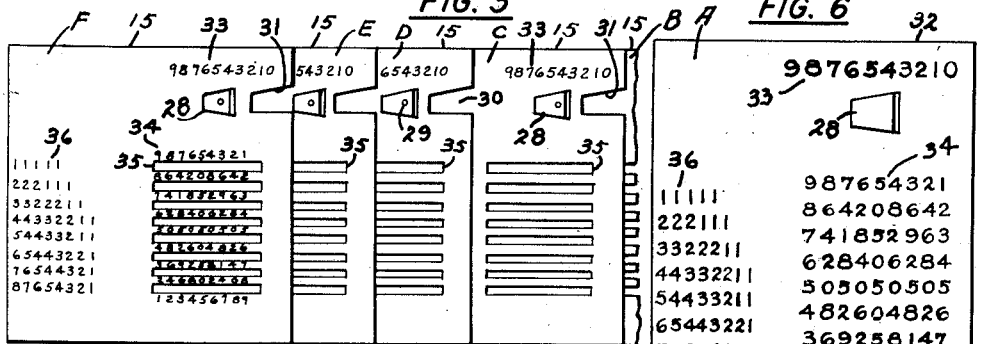
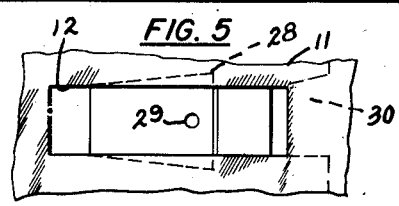
INVENTOR.
HUGO V. JORDAN
BY
J. B. Dickman Jr.
ATTORNEY Patented July 29, 1952

2,605,048

UNITED STATES PATENT OFFICE 2,605,048

SLIDE CALCULATOR

Hugo V. Jordon, La Paz, Bolivia

Application October 28, 1949, Serial No. 124,174

3 Claims. (Cl. 235—89)

The present invention relates to a calculating device and more particularly to a calculating device of the slide type, and one in which multiplication may be worked based on the Pythagoras table in which any number can be quickly multiplied by a digit, and the result obtained at a glance, thus eliminating the tedious process of digit by digit multiplication.

It is an object of the present invention to provide a slide calculator that will give a result in multiplication at a glance.

A still further object of the present invention is to provide a slide calculator having a minimum number of parts.

A still further object of the present invention is the provision of a slide calculator having a single slide.

A still further object of the present invention is the provision of a slide calculator having a mask with a plurality of windows, a plurality of horizontal slots and a plurality of vertical slots, and guide means on the rear side of the mask.

A still further object of the present invention is the provision of a slide calculator having a slide provided with a plurality of windows arranged in a diagonal relation vertically to each other and in spaced relation horizontally.

A still further object of the present invention is the provision of a plurality of plates having numerals and means on the plates engageable with the horizontal slots in the mask.

A still further object of the present invention is the provision of means for holding the slide and plates in slidable position.

With these and other objects in view, the advantages of the present invention will become more fully apparent as reference is made to the accompanying drawing, in which—

Figure 1 is a plan view of the device.

Figure 2 is a plan view of the slide and showing the windows arranged singularly and grouped in diagonal position, the slide being super-imposed upon plates.

Figure 3 is a plan view of the plates, one of the plates being shown fragmentarily.

Figure 4 is an enlarged partial sectional view taken on line 4—4 of Figure 1.

Figure 5 is an enlarged plan view of one of the slide tabs, the outline of the tab being shown in dotted lines as it would appear under an opaque housing, the housing being shown fragmentarily.

Figure 6 is a plan view of one of the plates.

Referring to the drawing the numeral 10 represents the slide calculator and it comprises a housing 11 that may be of any suitable transparent material such as plastic, Lucite or Celluloid, or it may be of opaque material of plastic, aluminum or other suitable metal and if made of said opaque material, suitable openings corresponding to openings 16 and 17 in mask 13 will be formed therein. The housing is provided with a plurality of horizontal oblong slots 12 that are adjacent the top longitudinal edge.

Within the housing 11 there is positioned a mask 13, a slide 14 and a plurality of plates 15. The mask 13 is provided with a plurality of windows 16 that are in spaced relation and adjacent the upper longitudinal edge, and below the windows 16 there is provided a plurality of horizontal oblong slots 21, that are in alignment with the slots 12 in the housing, and due to the positioning of slots 21 they are not seen in Figure 1 of the drawing. Beneath the horizontal slots in the mask and approximately of the center line of each of these slots there are a plurality of vertical slots 17 that are of a predetermined width and length, the upper end of slots 17 being spaced from the lower edges of slots 12 and 21, the lower end of slots 17 being spaced from the lower longitudinal edge of the mask. The mask at one end has a cut out portion 18, the opposite end having a short folded over portion (not shown), that provides a stop for the slide 14.

A window 20 is provided in the mask 13 adjacent one end and approximately in the center line of the slide 14. On the rear face of the mask 13 and depending from the lower edge of the horizontal slots 21 is a tab 22 that serves as a guide for the slide 14.

The slide 14 is provided with a plurality of windows 23 that are arranged in horizontal alignment and they are in spaced relation to each other, one corner 24 of each of the windows being on a bias. In diagonal alignment with each window 23 there is a plurality of vertical oblong windows 25 each having biased corners 26, the windows being in spaced relation horizontally. At one end of the slide 14 and midway the horizontal center line, there is provided in a horizontal line a plurality of numbers 27 from right to left 0 to 9, and these numbers are adapted to be viewed through the window 20.

Behind the slide 14 are plates 15 and 32 that are in lapped relation, each having a tab 28 and as shown in the drawing the outer end of the tabs are wider than the inner end, the tabs engage the slots 21 of the mask and portions of the inner face of the tabs engaging the outer face of the mask, the tabs support the plates for slidable movement. Each tab is provided with an aperture 29 that is adapted to receive a pointed object for movement of the plates 15 horizontally, or the tabs 28 may be engaged by the fingers of an operator for movement. Five of the plates 15 have a slot 30 in one vertical edge and these slots are in horizontal alignment with the tabs 28, the upper edge 31 being disposed at an inwardly inclined angle that prevents the corner from engaging objects during the horizontal movement. The end plate 32 has uniform vertical edges. Above the tabs 28 and the slots 30 are numerals 33 from 0 to 9 reading from right to left, these numerals being viewed through the windows 16. Five of the plates 15 on the right hand side are provided with horizontal lines of numerals 34, each of the numerals being in vertical alignment and these numerals represent the unit digits, and between each row of the numerals 34 there is provided horizontal slots 35. On the left hand side of the five plates 15 and in horizontal alignment with the horizontal slots 35 are numerals 36 that represent the tens of digits. End plate 32 as shown is identical with plates 15, with the exception it does not have the horizontal slots 35 or the slot 30.

In order that the description of operation of the device may be clear, the letters A, B, C, D, E and F from right to left have been applied to the plates 15, and to the vertical slots 17, the letters H, I, J, K, L, M and N from left to right, have been applied.

In operating the device the plates A, B, C, D, E and F are moved to the left until zero appears in the windows 16, and in this position the numerals 36 on the left hand side of plates A, B, C, D and E are in alignment with the slots 35 between the rows of numerals on the right hand side of the plates. The numerals 36 on the left hand side of plate F are not in engagement with horizontal slots 35. In the example of multiplication shown in Figure 1, the number to be multiplied is set up in the windows as follows, plate A is moved to the right until 4 is visible through window 16, B is moved to the right until 5 appears in window 16, C is moved to the right until 5 appears in window 16, plate D shows zero and is not moved, plate E is moved until 1 appears in window 16, and F is moved until numeral 4 appears in window 16. The slide 14 is then moved to the right until the multiplier number appears in window 20, and in the present example the numeral 2 is used. Referring now to slots 17, the numeral 8 appears in slot H, zero in slot I, in slot J numeral 1 appears over zero, the numeral 1 being on the left hand side of plate B, and viewed through one of the slots 35 in plate C, the zero being on the right hand side of plate C. The numeral 1 in slot K is one of the numerals on the left hand side of plate C viewed through one of the slots on plate D. The numeral 2 in slot L is on the right hand side of plate E, and the numeral 8 in slot M is on the right hand side of plate F.

While the invention has been disclosed in connection with certain specific embodiments thereof, it is to be understood that these are by way of example rather than by way of limitations and that the invention is to be defined by the attendant claims which should be given a scope as broad as is consistent with the prior art.

What is claimed is:

1. A calculating device comprising a mask, a slide and a plurality of plates, said mask having windows adjacent one longitudinal edge, a plurality of horizontal slots adjacent said windows, vertical slots below said horizontal slots and an aperture adjacent the right hand edge of said mask, said slide having a plurality of slots arranged diagonally, said last named slots adapted for alignment with said vertical slots during movement of said slide multiplier numerals adjacent the right hand edge of said slide, plates having numerals adjacent the top longitudinal edge, rows of numerals on the right hand side of each plate arranged in rows and columns representing unit digits, slots between the rows of numerals on the right hand side of said plates, rows of numerals on the left hand side of each of said plates arranged in rows and columns representing tens of digits and offset vertically so as to be located intermediate the rows of the units components and viewable through the slots between the rows of numerals when moved into alignment, the rows of numerals on the right hand side of each of said plates arranged in rows and columns and numerals at the top of said plates viewable through the slots and windows in the mask and slide.

2. A calculating device comprising a mask, a slide and a plurality of plates, said mask having windows adjacent one longitudinal edge, a plurality of horizontal slots adjacent said windows, vertical slots below said horizontal slots, said slide having a plurality of slots arranged diagonally and a horizontal row of multiplier numerals adjacent the right hand edge thereof, said last named slots adapted for alignment with said vertical slots during horizontal movement of said slide, said plates having numerals adjacent the top longitudinal edge, rows of numerals on the right hand side of said plates representing unit digits, rows of numerals on the left hand side of said plates representing tens digits, comma horizontal slots between the rows of numerals on the right hand side of said plates representing units digits, said rows of numerals on the left hand side of said plates aligning with the slots between the rows of numerals on the right hand side of said plates, the numerals on said plates adapted to be viewed through the windows and slots in the slide and mask when the slide is moved to a selected position.

3. A calculating device comprising a housing, a mask, a slide, and a plurality of plates, said mask having a plurality of windows along its upper edge, a horizontal slot beneath each of said windows, a vertical slot beneath each of said horizontal slots, and a window at the right side of said mask; a series of diagonally disposed groups of windows in said slide, each of which may be aligned with the proper vertical slot in said mask; a row of numerals on the right of said slide, one of said numerals being the multiplier when it is aligned with the window on the right of said mask; a manipulating tab on each of said plates, said tab extending through the horizontal slots on said mask, a row of numerals along the top edge of each plate, one of said numerals being the multiplicand when it is aligned with the corresponding window in the mask, a product table on each plate, rows and columns of figures on the left of each plate comprising the tens components, and rows of figures on the right of each plate comprising units components, and horizontal slots between each of said rows of units components whereby the tens components on the underlapped plate will appear through the diagonally disposed windows in the slide and the vertical slots in the mask thus displaying the product number.

HUGO V. JORDON.

REFERENCES CITED

The following references are of record in the file of this patent:

UNITED STATES PATENTS

| Number | Name | Date |
|---|---|---|
| 1,114,560 | Wild | Oct. 20, 1914 |
| 1,166,675 | Griffin | Jan. 4, 1916 |
| 1,234,956 | Streamberg | July 31, 1917 |
| 1,354,375 | Braly | Sept. 28, 1920 |
| 1,659,246 | Drew et al. | Feb. 14, 1928 |
| 2,485,892 | Kirschbaum | Oct. 25, 1949 |
| 2,494,609 | Dalboni | Jan. 17, 1950 |

FOREIGN PATENTS

| Number | Country | Date |
|---|---|---|
| 18,367 | Great Britain | 1908 |
| 527,611 | France | July 28, 1921 |